(12) United States Patent
Peczalski et al.

(10) Patent No.: US 7,884,753 B2
(45) Date of Patent: Feb. 8, 2011

(54) APPARATUS AND METHOD FOR RANGING OF A WIRELESS TRANSCEIVER WITH A SWITCHING ANTENNA

(75) Inventors: Andy Peczalski, Eden Prairie, MN (US); Fouad Nusseibeh, Champlin, MN (US)

(73) Assignee: Honeywell International Inc., Morristown, NJ (US)

( * ) Notice: Subject to any disclaimer, the term of this patent is extended or adjusted under 35 U.S.C. 154(b) by 79 days.

(21) Appl. No.: 12/025,158

(22) Filed: Feb. 4, 2008

(65) Prior Publication Data

US 2009/0195365 A1    Aug. 6, 2009

(51) Int. Cl.
*G01S 13/75* (2006.01)

(52) U.S. Cl. .................. 342/44; 342/50; 340/505; 340/539.22; 340/10.1; 340/10.4

(58) Field of Classification Search ............ 342/44
See application file for complete search history.

(56) References Cited

U.S. PATENT DOCUMENTS

| | | | | |
|---|---|---|---|---|
| 4,075,632 | A * | 2/1978 | Baldwin et al. ............. 342/51 |
| 5,606,574 | A * | 2/1997 | Hasegawa et al. ........... 375/130 |
| 5,940,006 | A * | 8/1999 | MacLellan et al. .......... 340/10.1 |
| 5,959,568 | A * | 9/1999 | Woolley ................... 342/42 |
| 6,043,774 | A   | 3/2000 | Singh et al. |
| 6,084,530 | A * | 7/2000 | Pidwerbetsky et al. ...... 340/10.1 |
| 6,466,130 | B2 * | 10/2002 | Van Horn et al. .......... 340/572.1 |
| 6,838,989 | B1 * | 1/2005 | Mays et al. ............... 340/572.1 |
| 6,868,073 | B1  | 3/2005 | Carrender |
| 7,016,311 | B2 * | 3/2006 | Tiernay et al. ............. 370/252 |
| 7,016,647 | B2 * | 3/2006 | Albert et al. .............. 455/41.2 |
| 7,024,331 | B2  | 4/2006 | Jones et al. |
| 7,026,935 | B2 * | 4/2006 | Diorio et al. .............. 340/572.2 |
| 7,026,941 | B1 * | 4/2006 | Anderson ................. 340/573.1 |
| 7,265,675 | B1 * | 9/2007 | Carrender et al. .......... 340/572.7 |
| 7,348,875 | B2 * | 3/2008 | Hughes et al. ............. 340/10.4 |
| 7,394,382 | B2 * | 7/2008 | Nitzan et al. .............. 340/572.8 |
| 7,469,127 | B2 * | 12/2008 | Takiguchi ................. 455/41.1 |
| 7,479,884 | B1 * | 1/2009 | Fullerton ................. 340/572.7 |
| 7,512,236 | B1 * | 3/2009 | Zhu ....................... 380/255 |

(Continued)

FOREIGN PATENT DOCUMENTS

WO    WO 2007/005035 A2    1/2007

*Primary Examiner*—Thomas H Tarcza
*Assistant Examiner*—Matthew M Barker
(74) *Attorney, Agent, or Firm*—Munck Carter, LLP (57) ABSTRACT

A sensor includes a transceiver configured to receive a wireless signal from an interrogator and to reflect the wireless signal back. The sensor also includes an antenna-switching modulator configured to modulate a radar cross-section of the sensor by repeatedly switching an antenna between, for example, a short-circuit position and an operational circuit position. The operational circuit position could be associated with an impedance matched receiver, and the short-circuit position could be associated with ground. Also, the sensor could be further configured to transmit the wireless signal to a second sensor and to receive a reflected wireless signal from the second sensor, and the sensor could further include a phase comparator configured to compute a phase difference between the transmitted wireless signal and the reflected wireless signal. The phase comparator could be further configured to compute a distance between the sensor and the second sensor based on the phase difference.

20 Claims, 5 Drawing Sheets

U.S. PATENT DOCUMENTS

| | | |
|---|---|---|
| 7,516,057 B2 * | 4/2009 | Bridgelall .................... 703/13 |
| 7,556,194 B2 * | 7/2009 | Rogoyski .................... 235/385 |
| 2002/0008615 A1 * | 1/2002 | Heide et al. ................. 340/426 |
| 2004/0008112 A1 * | 1/2004 | Carrender .............. 340/539.26 |
| 2005/0190098 A1 * | 9/2005 | Bridgelall et al. ........... 342/118 |
| 2005/0237953 A1 * | 10/2005 | Carrender et al. ........... 370/278 |
| 2006/0001528 A1 * | 1/2006 | Nitzan et al. ............. 340/10.33 |
| 2006/0006986 A1 * | 1/2006 | Gravelle et al. ............ 340/10.3 |
| 2006/0007049 A1 * | 1/2006 | Nitzan et al. ................. 343/904 |
| 2006/0012464 A1 * | 1/2006 | Nitzan et al. ............... 340/10.1 |
| 2006/0044147 A1 * | 3/2006 | Knox et al. .............. 340/686.1 |
| 2006/0176153 A1 * | 8/2006 | Tang ......................... 340/10.4 |
| 2006/0284727 A1 * | 12/2006 | Steinke .................... 340/10.31 |
| 2007/0035395 A1 * | 2/2007 | Trosper ...................... 340/571 |
| 2007/0285245 A1 * | 12/2007 | Djuric et al. ............. 340/572.1 |
| 2008/0129512 A1 * | 6/2008 | Bielas et al. ............. 340/572.7 |
| 2008/0129513 A1 * | 6/2008 | Bielas et al. ............. 340/572.7 |
| 2008/0218357 A1 * | 9/2008 | March et al. ............. 340/573.1 |
| 2008/0272890 A1 * | 11/2008 | Nitzan et al. ............... 340/10.1 |
| 2008/0274697 A1 * | 11/2008 | Ito .............................. 455/42 |
| 2009/0045916 A1 * | 2/2009 | Nitzan et al. ............... 340/10.1 |
| 2009/0140860 A1 * | 6/2009 | Forster .................... 340/572.1 |

* cited by examiner

FIGURE 6

APPARATUS AND METHOD FOR RANGING OF A WIRELESS TRANSCEIVER WITH A SWITCHING ANTENNA

TECHNICAL FIELD

This disclosure relates generally to location detection and more specifically to an apparatus and method for ranging of a wireless transceiver with a switching antenna.

BACKGROUND

Smoke, carbon monoxide, and other detection systems are routinely used in residential homes, commercial buildings, and other structures. These detection systems routinely include sensors, such as smoke or carbon monoxide detectors, distributed throughout a structure. The sensors operate to detect smoke, carbon monoxide, or other materials or conditions. The sensors are often coupled to a controller. Based on the signals received from the sensors, the controller determines if and when to activate an alarm (such as an audible alarm), notify appropriate personnel (such as a fire department or an alarm monitoring company), or activate a fire-suppression or other system (such as a sprinkler system).

Each of the sensors distributed in a residential, commercial, or other structure typically contains sensing components used to detect smoke, carbon monoxide, or other materials or conditions. This may allow the controller to determine the location of a problem reported by one or more of the sensors. Various techniques are known for identifying the location of an object. For example, radar cross-section (RCS) describes the extent to which an object reflects an incident electromagnetic wave. It is a measure of the strength of the radar signal backscattered from a "target" object for a given incident wave power.

SUMMARY

This disclosure provides an apparatus and method for ranging of a wireless transceiver with a switching antenna.

In a first embodiment, a sensor includes a transceiver configured to receive a wireless signal from an interrogator and to reflect the wireless signal back. The sensor also includes an antenna-switching modulator configured to modulate a radar cross-section of the sensor by repeatedly switching an antenna between a short-circuit position and an operational circuit position.

In a second embodiment, a method includes receiving a wireless signal from an interrogator at a sensor. The method also includes modulating a radar cross-section of the sensor by repeatedly switching an antenna between a short-circuit position and an operational circuit position. The method further includes returning a reflected wireless signal back to the interrogator.

In a third embodiment, a system includes a sensor configured to receive a wireless signal, modulate a radar cross-section of the sensor by repeatedly switching an antenna between a short circuit position and an operational circuit position, and reflect the wireless signal back. The system also includes an interrogator configured to send the wireless signal to the sensor, receive the reflected wireless signal from the sensor, determine a phase difference between the wireless signal and the reflected wireless signal, and compute a distance between the sensor and the interrogator.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

The desired accuracy for the position of a sensor can vary depending on the application and can be quite small, such as on the order of a foot or less for applications such as smoke detection systems or biochemical material detection systems. For existing technologies and systems, such accuracy often can be achieved only with expensive system components based on time-of-flight and elaborate synchronization infrastructures.

Figure 1:
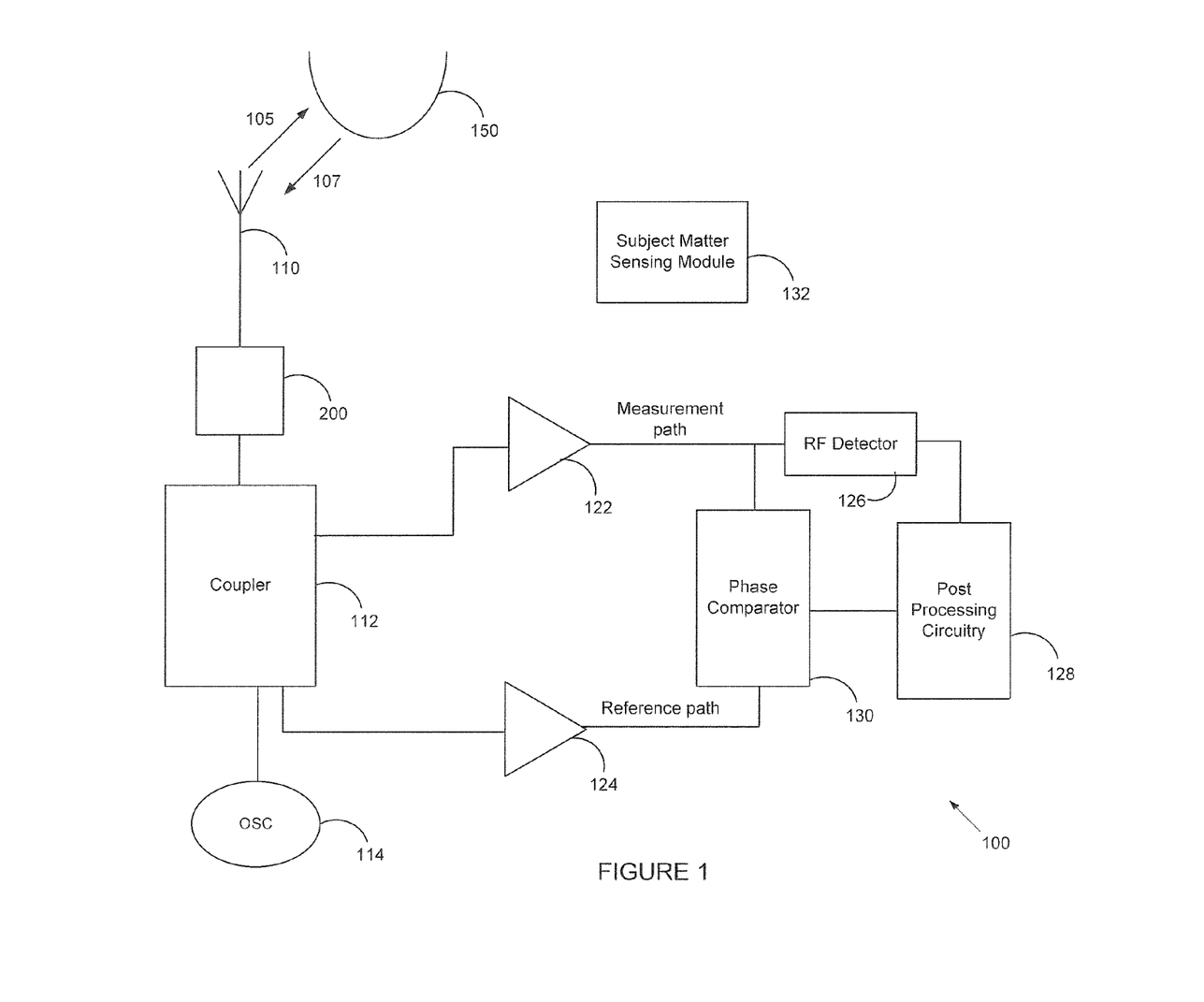
FIG. 1 illustrates an example sensor according to one embodiment of this disclosure.

FIG. 1 illustrates an example sensor 100 according to one embodiment of this disclosure. The embodiment of the sensor 100 shown in FIG. 1 is for illustration only. Other embodiments of the sensor 100 could be used without departing from the scope of this disclosure.

As shown in FIG. 1, the sensor 100 includes an antenna 110, an antenna-switching modulator 200, a coupler 112, an oscillator 114, a first signal processor 122, a second signal processor 124, a radio frequency (RF) detector 126, post-processing circuitry 128, a phase comparator 130, and a subject matter sensing module 132. In some embodiments, the sensor 100 is designed to operate in the 2-3 GHz range using off-the-shelf modular components. However, any other suitable wireless signals at any suitable frequencies could be used.

The antenna 110 can receive and transmit wireless signals to and from another wireless device, such as a second sensor. The antenna 110 represents any suitable structure for transmitting or receiving wireless signals. For example, the antenna 110 can represent a planar antenna or other type of antenna. The antenna 110 could also be constructed with a resonant patch on a dielectric substrate. In particular embodiments, the antenna 110 can be mounted outside the sensor's box or case and can be connected to the coupler 112 by an impedance matched cable. The antenna 110 is configured to transmit a signal 105 outward. In the presence of a suitable target object 150 (such as another sensor), the antenna 110 also receives an externally-reflected echo signal 107. The received signal is routed to the signal processors 124 and 122.

The oscillator 114 transmits an RF signal through the coupler 112 to the antenna 110. The oscillator 114 may allow a wireless signal output from the antenna 110 to match a desired frequency or a reference signal. The oscillator 114 represents any suitable oscillator, such as a voltage-controlled oscillator (VCO). In some embodiments, the oscillator 114 operates at a fixed frequency of 2.4 Ghz.

The coupler 112 separates the transmitted signal energy of the signal 105 from the reflected signal energy of the signal 107. This allows the sensor 100 to use one antenna 110 for signal flow in both directions. To ensure that the externally-reflected signal 107 has a larger magnitude than that reflected back towards the coupler 112 within the sensor 100 itself, the antenna 110 may be terminated in a conventional compensation circuit. The compensation circuits may not be sufficient if the measured distance is larger than 2-3 feet since the crosstalk (unintentional coupling between transmit and receive ports) of the coupler 112 is on the order of 30 dB. Two techniques may be used to minimize that problem: pulsed carrier and modulation of the antenna with a known chip pattern. The pulsed carrier allows for a quiet (no transmission) time when the signal is received. The pulse period has to be shorter than the minimum round trip flight time. The modulation of the antenna with the known chip pattern allows for the correlation of the return signal with the known chip pattern. The correlation gain will recover the return signal even if it is interfered with by the crosstalk in the coupler 112. The reflected signal energy of the signal 107 is provided to the first signal processor 122 along a measurement path.

The coupler 112 also routes a portion of the signal from the oscillator 114 to the signal processor 124 along a reference path. By including the coupler 112 in the reference path, the signal processors 122-124 may be employed. In this way, the time delay offset between the measurement path and the reference path can be substantially eliminated. The coupler 112 includes any suitable structure for coupling multiple components to an antenna.

The signal processor 122 performs signal measurement along the measurement path for the externally-reflected echo signal 107. The signal processor 124 performs signal measurement along the reference path for the wireless signal 105 that is transmitted by the antenna 110. The signal processors 122-124 can also be configured to process the signals before transmission or further processing. Each of the signal processors 122-124 includes any suitable structure for processing signals. For example, the signal processors 122-124 may include matched filters and amplifiers to process a wireless signal. The signal processors 122-124 may also help to exclude spurious noise received by the antenna 110. The signal processors 122-124 may operate at the same frequency as the oscillator 114. In some embodiments, the oscillator 114 and the signal processors 122-124 all operate at a fixed frequency of about 2.4 GHz. In other embodiments the oscillator frequency may be turned on and off with repetition time shorter than the flight time of the return trip. Bandpass filters are tuned to that frequency or correlation algorithms may also be used with the signal processors. The signal processors 122-124 may further include amplitude equalization components and amplifiers. In particular embodiments, the signal processor 122 includes three ERA-3SM amplifiers, and the signal processor 124 includes two ERA-3SM amplifiers.

The phase comparator 130 can detect a phase difference between the signals output by the signal processors 122-124. The phase comparator 130 may then compute a distance between the antenna 110 and the target object 150 that reflects the wireless signal (as described more fully below). The phase comparator 130 includes any suitable structure for identifying a phase difference between signals.

In some embodiments, the phase comparator 130 may compute the distance between the sensor 100 and the target object 150 as follows. First, it is assumed that the measurement signal and the reference signal both have the same wavelength and similar amplitudes. A common double-balanced mixer can serve as a phase comparator 130 to match the frequency and amplitudes of the two signals. A distance from the antenna 110 to the target object 150 is the target range "R," which can be determined as $$R \approx \lambda_o * \Phi / 4 * \Pi,$$

where $\Phi$ is the phase difference and $\lambda_o$ is the wavelength of the modulation.

The phase comparator 130 may also feed the measurement and reference signals to the RF detector 126 and the post-processing circuitry 128, respectively. The RF detector 126 is connected to the output of the signal processor 122 and measures the strength of the echo signal 107 from the signal processor 122 in the measurement path. In this example, the phase comparator 130 provides to the post-processing circuitry 128 a voltage that is representative of the phase difference between the reference signal 105 and the reflected signal 107. This phase difference indicates a distance of the target object 150 from the antenna 110. The phase difference-based distance computation performed by the post-processing circuitry 128 is described in U.S. Pat. No. 6,043,774, which is hereby incorporated by reference.

The subject matter sensing module 132 represents components used to detect one or more materials or conditions. For example, the subject matter sensing module 132 could detect the presence of smoke, carbon monoxide, fire, a biological material, a chemical, or any other suitable material(s). The subject matter sensing module 132 includes any suitable structures for detecting or measuring one or more materials.

The sensor 100 can be passive or active. A passive sensor does not have its own power source and can only reflect passively an RF signal. An active sensor does have a power source and can actively transmit RF signals.

Although FIG. 1 illustrates one example of a sensor 100, various changes may be made to FIG. 1. For example, the functional layout of the sensor 100 is for illustration only. Various components in FIG. 1 could be combined, subdivided, or omitted and additional components could be added according to particular needs.

Figure 2:
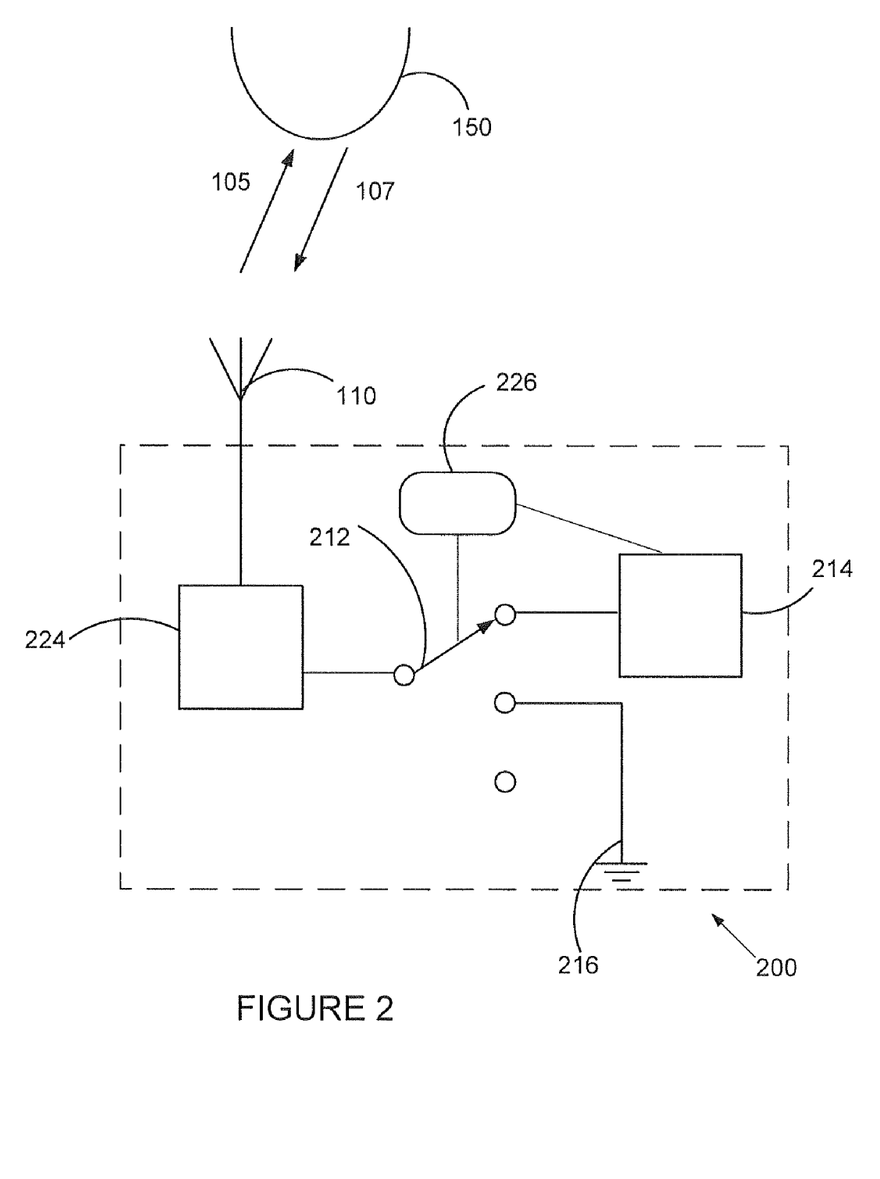
FIG. 2 illustrates an example antenna-switching modulator according to one embodiment of this disclosure.

FIG. 2 illustrates an example antenna-switching modulator 200 according to one embodiment of this disclosure. The embodiment of the antenna-switching modulator 200 shown in FIG. 2 is for illustration only. Other embodiments of the antenna-switching modulator 200 could be used without departing from the scope of this disclosure.

In this example, the antenna-switching modulator 200 can modulate wireless signals to be transmitted by repeatedly switching an antenna between a short-circuit position and an operational circuit position. In general the antenna can be modulated by comparing any two out of the three positions: short circuit (ideally negative reflection), open circuit (ideally positive complete reflection) and operational (impedance matched) connection (ideally no reflection). As shown in FIG. 2, the antenna-switching modulator 200 is coupled to the antenna 110 and includes an antenna switch 212, a match transceiver 214, a ground 216, and a controller 226. One unique feature of the wireless signal reflection functionality is the modulation of the sensor's radar cross-section, which is denoted as cross-section 224. The cross-section 224 describes the extent to which the sensor 100 reflects electromagnetic waves. The modulation of the cross-section 224 is performed by the antenna switch 212, which repeatedly switches the antenna 110 from the match transceiver 214 (such as a 50-ohm match receiver) to ground 216 and back. The match transceiver 214 can receive the wireless signals and pass the signals on to the signal processor 122 and/or the coupler 112. The controller 226 is configured to control the transceiver 214 and the antenna switch 212.

In some embodiments, the antenna switch 212 modulates the antenna switching with a sinusoidal waveform pattern that is phase locked to the carrier signal. The phase of the return echo signal 107 is measured with respect to the transmitted continuous wave (CW) signal to determine the distance. The phase can be unique over 90°. The sensor antenna can also be modulated with the digital chip pattern to provide the correlation gain as explained earlier.

The antenna switching with known sinusoidal or digital pattern allows the sensor 100 to distinguish and reject clutter or interfering signals from targets other than the intended target object 150 using a bandpass or correlation filter. This is possible because the clutter or interfering signals are not modulated with the antenna switching, such as when an incorrect target has a radar cross-section that is stationary in time or that changes with a low frequency. The phase of the return echo signal 107 can be measured with respect to the transmitted CW signal to determine the distance. In some embodiments, the distance D can be determined as:

$$D = p/2\pi \ast aw/2$$

where p is the length of the phase and aw is the wavelength of the antenna-switching modulation. As noted above, the phase can be unique over 90°, which could correspond to a modulation frequency of 3.75 MHz for a 10-meter total distance. The phase detection may allow for resolving the distance to at least 1% of 90°, meaning a 0.2 meter accuracy. In some embodiments, the range accuracy can be increased to, for example, 2 mm after applying another modulation frequency at 375 MHz.

In some embodiments, integration over other components may be needed to offset signal losses (such as "in wall" losses due to structural walls) and scattering. For example, a double trip through a wall may introduce 20 dB of signal energy losses, which can amount to the correlation gain with 100 modulation cycles, also termed modulation chips, or the averaging noise reduction with averaging 10,000 cycles. In other embodiments, the antenna-switching modulator 200 can be enhanced, such as with an additional amplifier and a 2 dB coupler, to compensate for the propagation losses.

In some embodiments, the antenna-switching modulator 200 can use off-the-shelf components, and one advantage of the antenna-switching modulator 200 is the low cost of the resulting sensor 100. Other advantages of the antenna-switching modulator 200 can include being relatively immune to dust, smoke, dirt, and build-up of contaminants on the sensors, the ability to detect and range both metallic and non-metallic objects, fast switching speeds and response times, and small sizes with low power requirements.

Figure 3:
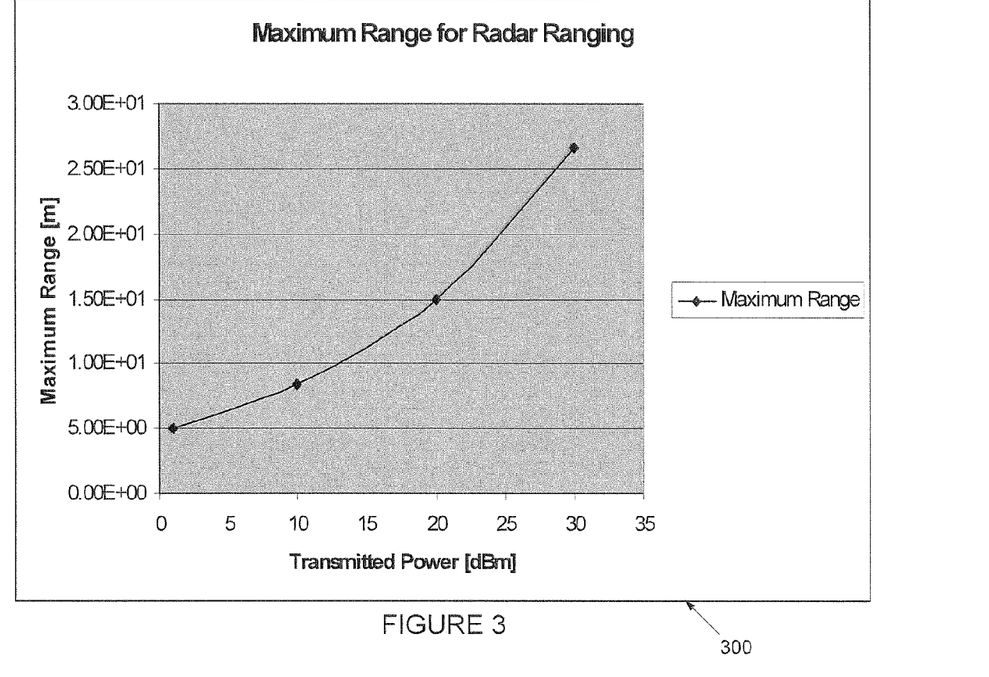
FIG. 3 illustrates an example graph of transmitted power and maximum range for radar ranging according to one embodiment of this disclosure.
Figure 4:
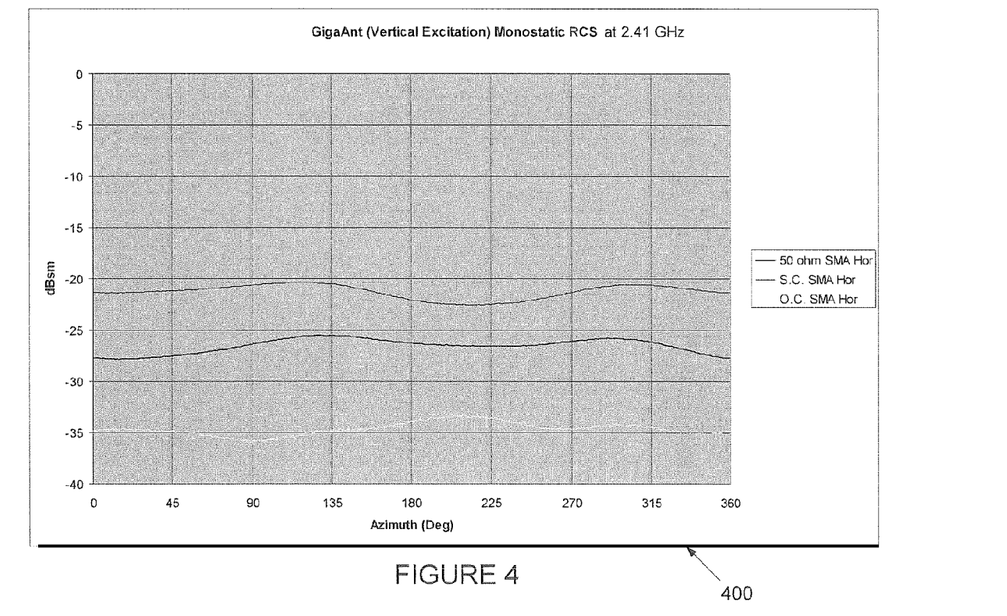
FIG. 4 illustrates an example graph of modulation amplitude and antenna gain using antenna-switching modulation according to one embodiment of this disclosure.

Example behaviors of this ranging functionality are shown in FIGS. 3 and 4. For example, FIG. 3 illustrates an example graph 300 of transmitted power and maximum range for radar ranging according to one embodiment of this disclosure. As shown in FIG. 3, distance could be measured over the range of 10 meters with a transmitted power of 13 dBm. Also, FIG. 4 illustrates an example graph 400 of modulation amplitude and antenna gain using antenna-switching modulation according to one embodiment of this disclosure. In this example, the modulation of the reflected power is obtained by switching the antenna between a normal, impedance matched receiving position and a ground connection. As shown in FIG. 4, the modulation amplitude is equal to twice the gain of the antenna, such as −8 dB over the 2.31-2.51 GHz range. In some embodiments, a radar cross-section lower than what can be achieved by the antenna-switching modulator 200 is obtained using an open circuit antenna in the antenna-switching modulation.

Although FIG. 2 illustrates one example of an antenna-switching modulator 200, various changes may be made to FIG. 2. For example, the functional layout of the antenna-switching modulator 200 is for illustration only. Various components in FIG. 2 could be combined, subdivided, or omitted and additional components could be added according to particular needs. Also, while FIGS. 3 and 4 illustrate example results associated with the antenna-switching modulator 200, the antenna-switching modulator 200 could operate in any other suitable manner.

Figure 5:
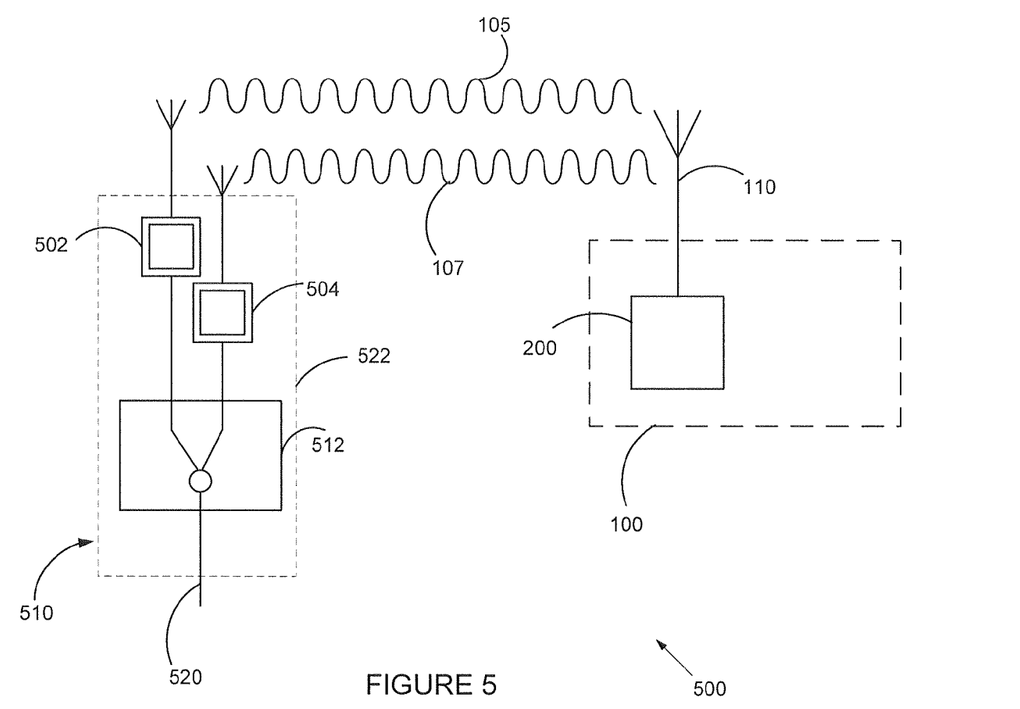
FIG. 5 illustrates an example detection system according to one embodiment of this disclosure.

FIG. 5 illustrates an example detection system 500 according to one embodiment of this disclosure. The embodiment of the detection system 500 shown in FIG. 5 is for illustration only. Other embodiments of the detection system 500 could be used without departing from the scope of this disclosure.

In this example, the detection system 500 is used to detect the presence of one or more materials or conditions in a specified area. For example, the detection system 500 could be used to detect smoke, fire, carbon monoxide, biochemical contaminants, or other material(s) or condition(s) in a residential, commercial, or other structure or environment.

As shown in FIG. 5, the detection system 500 includes an interrogator 510 and a sensor 100. The interrogator 510 includes a transmitter 502 and a receiver 504. The transmitter 502 generates a wireless signal 105, which is transmitted to the sensor 100. The receiver 504 receives a reflected wireless signal 107, which is at the same frequency as the wireless signal 105. A phase comparison circuit 512 analyzes both the wireless signal 105 and the reflected wireless signal 107 and determines a phase difference between the two signals' waveforms. The phase comparison circuit 512 then computes the distance of the sensor 100 from the interrogator 510 based on the phase difference. The phase comparison circuit 512 outputs the result through an output 520.

In this example, the sensor 100 may be the same as or similar to the one illustrated in FIG. 1 and described above. The sensor 100 in FIG. 5 is responsible for reflecting the wireless signal 105 and returning a reflected wireless signal 107. The sensor 100 utilizes a sensor antenna 110, and a unique feature of the wireless signal reflection is the modulation of the sensor's radar cross-section. The modulation of the sensor's cross-section is performed by the antenna-switching module 200, which switches the antenna 110 from, for example, a 50-ohm match receiver to ground and back. In the system 500 as illustrated by FIG. 5, the sensor 100 functions as a target interrogated by the interrogator 510, and the sensor 100 performs the antenna-switching modulation. The interrogator 510 detects a phase difference between the two wireless signals 105 and 107 and computes a distance between the interrogator 510 and the sensor 100 using the phase difference. In other embodiments, the interrogator 510 can be a second sensor.

Although FIG. 5 illustrates one example of a detection system 500, various changes may be made to FIG. 5. For example, the sensor 100 could be used in conjunction with any other suitable system.

Figure 6:
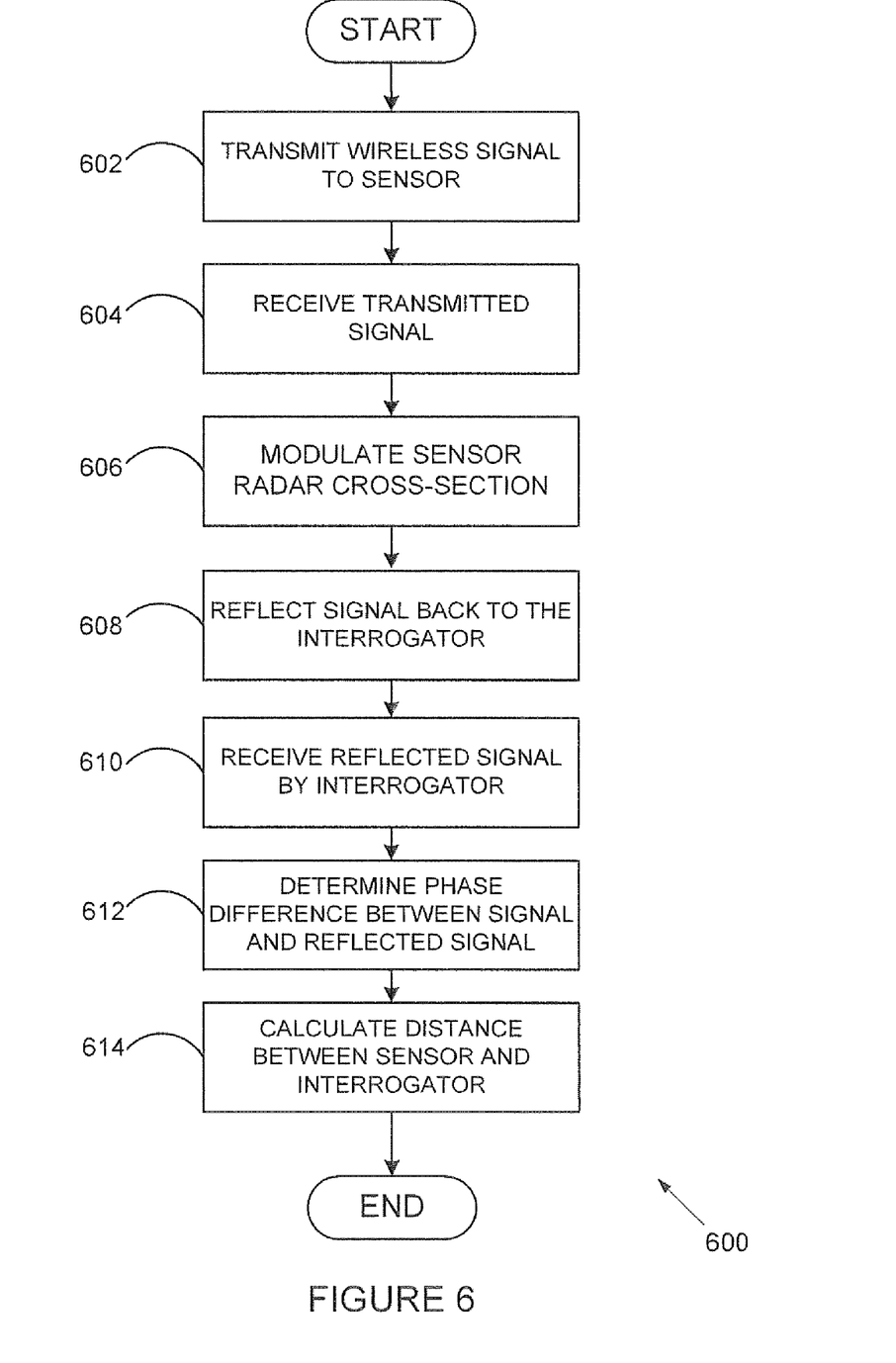
FIG. 6 illustrates an example method for antenna-switching based on wireless ranging according to one embodiment of this disclosure.

FIG. 6 illustrates an example method 600 for antenna-switching based on wireless ranging according to one embodiment of this disclosure. The embodiment of the method 600 shown in FIG. 6 is for illustration only. Other embodiments of the method 600 could be used without departing from the scope of this disclosure.

Wireless signals are transmitted to a sensor at 602. This may include, for example, sending an interrogating wireless signal from an interrogator in an attempt to determine the precise location of a sensor 100. A wireless signal can be transmitted using a wireless transceiver, such as by broadcasting an RF signal containing position information. However, any other suitable signal could be transmitted to the sensor 100.

A wireless signal is received by the sensor at step 604. This may include, for example, receiving the transmitted interrogating wireless signal at a sensor 100. The frequency of the wireless signal may be the same as the frequency at which the wireless signal is transmitted. In some embodiments, the unregulated 2.4 GHz spectrum is chosen as the transmission frequency, partially because of its ready availability in off-the-shelf components for this frequency.

The radar cross-section of the sensor is modulated at step 606. This may include, for example, switching a transmission and receiving antenna repeatedly between a short or open circuit position and a normal operational circuit position. This may also involve deciding an amplitude and a frequency of the modulation, according to factors such as a perceived level of interference from other objects, a transmission power, and operating ranges of the interrogator and the sensor (among others). To address the issue of the reflected wireless signal being interfered by the transmitting power, the step also includes modulating the radar cross-section of the sensor by repeatedly switching an antenna with a chip pattern or a fixed frequency. In addition, a sub-step of turning the reflected wireless signal on and off with a time interval shorter than a shortest round trip flight time at the interrogator can either avoid or minimize the interference of transmitting power to the reflected wireless signal.

The wireless signal is reflected back to the sender at step 608. This may include, for example, reflecting the modulated signals back to the interrogator by the sensor 100. This may also involve transmitting the modulated signal using the same antenna from which the original wireless signal is received.

The reflected signal is received by the interrogator at step 610. This may include, for example, receiving the reflected signal at an antenna of the interrogator, where the interrogator identifies the modulated signal from among various potential multiple interfering signals. This may also include the interrogator demodulating the antenna-switching modulated signals.

A phase difference between the original wireless signal and the reflected signal is determined at step 612. This may include, for example, comparing the phase of the original wireless signal against that of the reflected wireless signal and identifying a phase difference. This may also involve amplifying the wireless signals to identify the phase difference more accurately.

A distance between the interrogator and the sensor is determined using the phase difference at step 614. This may include, for example, using an established formula to calculate the distance, taking into consideration the identified phase difference. In some embodiments, the distance D is calculated as $D = p/2\pi * aw/2$, where p is the length of the phase and aw is the wavelength of the antenna-switching modulation.

Although FIG. 6 illustrates one example of a method 600 for antenna-switching based on wireless ranging, various changes may be made to FIG. 6. For example, while shown as a series of steps, various steps in FIG. 6 could overlap, occur in parallel, or occur in a different order. Also, the method 600 has been described as involving an interrogator transmitting wireless signals to the sensor. In other embodiments, a first sensor could transmit the wireless signals to a second sensor, so the first sensor could be viewed as the interrogator.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of the invention, as defined by the following claims.

What is claimed is:

1. A sensor comprising:
   a transceiver configured to receive a wireless signal from an interrogator and to reflect the wireless signal back; and
   an antenna-switching modulator configured to modulate a radar cross-section of the sensor by repeatedly switching an antenna between two of a short-circuit position, an open-circuit position, and an operational circuit position;
   wherein the antenna-switching modulator is configured to select at least one characteristic of the modulation of the sensor's radar cross-section based on one or more of: a perceived level of interference and a transmission power; and
   wherein the antenna-switching modulator is further configured to modulate the antenna switching with a sinusoidal waveform pattern that is phase locked to the received wireless signal.

2. The sensor of claim 1, wherein the transceiver is further configured to transmit a second wireless signal to a second sensor and to receive a reflected second wireless signal from the second sensor.

3. The sensor of claim 2, further comprising a phase comparator configured to compute a phase difference between the transmitted second wireless signal and the reflected second wireless signal.

4. The sensor of claim 3, wherein the phase comparator is further configured to compute a distance between the sensor and the second sensor based on the phase difference.

5. The sensor of claim 2, wherein the transceiver is configured to receive multiple reflected second wireless signals that are reflected off the second sensor and multiple other targets each having a stationary radar cross-section or a radar cross-section that changes at a lower frequency; and further comprising a signal processor configured to (i) remove the reflected second wireless signals that were reflected off the other targets and (ii) output the reflected second wireless signal that was reflected off the second sensor.

6. The sensor of claim 5, wherein the signal processor comprises at least one of: a bandpass filtering routine and a correlation routine.

7. The sensor of claim 1, wherein the antenna-switching modulator is configured to provide for a signal gain for the reflected wireless signal.

8. The sensor of claim 1, wherein:
the antenna-switching modulator is configured to modulate the radar cross-section of the sensor by repeatedly switching the antenna between the short-circuit position and the operational circuit position;
the operational circuit position is associated with an impedance matched receiver; and
the short-circuit position is associated with ground.

9. The sensor of claim 1, wherein the at least one characteristic of the modulation of the sensor's radar cross-section comprises one or more of: an amplitude of the modulation and a frequency of the modulation.

10. The sensor of claim 1, further comprising a subject matter sensing module configured to detect a presence of a subject matter, wherein the subject matter comprises at least one of: heat, smoke, carbon monoxide, and a biochemical material.

11. The sensor of claim 1, wherein the sensor comprises a passive sensor.

12. A method comprising:
receiving a wireless signal from an interrogator at a sensor;
selecting at least one characteristic for a modulation of a radar cross-section of the sensor based on one or more of: a perceived level of interference and a transmission power;
modulating the radar cross-section of the sensor by repeatedly switching an antenna between two of a short circuit position, an open-circuit position, and an operational circuit position, wherein the modulating has the at least one identified characteristic;
returning a reflected wireless signal back to the interrogator; and
modulating the antenna switching with a sinusoidal waveform pattern that is phase locked to the received wireless signal.

13. The method of claim 12, further comprising:
detecting a phase difference between the wireless signal and the reflected wireless signal at the interrogator; and
calculating a distance between the sensor and the interrogator based on the phase difference.

14. The method of claim 13, wherein the interrogator receives multiple reflected wireless signals reflected off the sensor and multiple other targets each having a stationary radar cross-section or a radar cross-section that changes at a lower frequency; and further comprising removing the reflected wireless signals that were reflected from the other targets using at least one of: a bandpass filtering process and a correlation process and outputting the reflected wireless signal that was reflected off the sensor.

15. The method of claim 13, wherein detecting the phase difference comprises minimizing interference between the wireless signal and the reflected wireless signal at the interrogator.

16. The method of claim 12, wherein the sensor comprises a passive sensor.

17. The method of claim 12, further comprising providing a signal gain for the reflected wireless signal.

18. A system comprising:
a sensor configured to (i) receive a wireless signal, (ii) select at least one characteristic of a modulation of a radar cross-section of the sensor based on one or more of: a perceived level of interference and a transmission power, (iii) modulate the radar cross-section of the sensor by repeatedly switching an antenna between two of: a short circuit position, an open circuit position, and an operational circuit position, and (iv) reflect the wireless signal back, wherein the modulating has the at least one identified characteristic; and
an interrogator configured to (i) send the wireless signal to the sensor, (ii) receive the reflected wireless signal from the sensor, (iii) determine a phase difference between the wireless signal and the reflected wireless signal, and (iv) compute a distance between the sensor and the interrogator using the determined phase difference;
wherein the sensor is further configured to
modulate the antenna switching with a sinusoidal waveform pattern that is phase locked to the received wireless signal.

19. The system of claim 18, wherein the phase difference is proportional to an actual distance of a two-way signal trip between the sensor and the interrogator.

20. The system of claim 18, wherein the interrogator comprises another sensor.

* * * * *